(12) United States Patent
Jonsson

(10) Patent No.: US 10,880,249 B1
(45) Date of Patent: Dec. 29, 2020

(54) SYSTEMS AND METHODS FOR A FILTER AND MESSAGE DELIVERY PLATFORM

(71) Applicant: Amazon Technologies, Inc., Reno, NV (US)

(72) Inventor: Jan Henrik Jonsson, Long Beach, CA (US)

(73) Assignee: Amazon Technologies, Inc., Seattle, WA (US)

( * ) Notice: Subject to any disclaimer, the term of this patent is extended or adjusted under 35 U.S.C. 154(b) by 362 days.

(21) Appl. No.: 15/820,946

(22) Filed: Nov. 22, 2017

(51) Int. Cl.
*H04L 12/58* (2006.01)
*H04L 29/08* (2006.01)
*G06Q 30/02* (2012.01)

(52) U.S. Cl.
CPC ............ *H04L 51/12* (2013.01); *H04L 51/063* (2013.01); *H04L 67/306* (2013.01); *G06Q 30/0255* (2013.01); *H04L 51/046* (2013.01); *H04L 51/20* (2013.01)

(58) Field of Classification Search
CPC ..... H04L 51/02; H04W 4/12; G06Q 30/0242; G06Q 30/0251; G06N 20/00
See application file for complete search history.

(56) References Cited

U.S. PATENT DOCUMENTS

| | | | | |
|---|---|---|---|---|
| 8,775,334 | B1 * | 7/2014 | Lloyd | G06Q 30/0242 706/12 |
| 9,071,579 | B1 * | 6/2015 | Bender | H04L 63/0428 |
| 9,727,877 | B2 * | 8/2017 | Rosler | G06Q 30/02 |
| 2006/0053146 | A1 * | 3/2006 | Allhusen | H04L 67/325 |
| 2008/0255944 | A1 * | 10/2008 | Shah | H04L 67/306 705/14.47 |
| 2009/0197582 | A1 * | 8/2009 | Lewis | H04L 67/04 455/414.2 |
| 2011/0276375 | A1 * | 11/2011 | Strunk | G06Q 30/02 705/14.16 |
| 2013/0073725 | A1 * | 3/2013 | Bordeleau | H04L 67/34 709/224 |
| 2015/0170213 | A1 * | 6/2015 | O'Malley | G06Q 30/0267 705/14.41 |
| 2016/0378569 | A1 * | 12/2016 | Ristock | G06Q 10/00 718/104 |

* cited by examiner

*Primary Examiner* — Benjamin M Thieu
(74) *Attorney, Agent, or Firm* — Hogan Lovells US LLP

(57) ABSTRACT

Embodiments of the present invention provide improved techniques for securely delivering content and messages to endpoints. Based on a strategic program for delivering the content, the messages may be delivered according to a schedule and to particular endpoints. Embodiments of the present invention provide the ability to apply filters in order to determine a set of endpoints according to the delivery schedule. The messages may be further modified to improve security by adding authentication mechanisms and other attributes that enhance the content delivered to the endpoints.

20 Claims, 5 Drawing Sheets

US 10,880,249 B1

SYSTEMS AND METHODS FOR A FILTER AND MESSAGE DELIVERY PLATFORM

BACKGROUND

As users increasingly access content electronically and conduct transactions electronically over the Internet, content providers are presented with the problem of how to communicate with a plurality of users and how messages are delivered to specific users. With the wide variety of devices that users may use and the different preferences users have for message delivery, delivering content and messages to users presents several technical problems. While some content providers may specifically select content for certain devices to be displayed to particular users, individual customization for users and each user's devices may be inefficient, prone to error, and unrealistic as users are constantly changing devices and preferences. Additionally, the messaging and content that content providers wish to provide to users may be dynamic and have different technical specifications. For example, an application running on a mobile device may notify users of a promotion, however the promotion may have several restrictions for which users it may be applicable for, and the promotion display may need to be compatible with a variety of devices so that it is properly displayed.

In conventional approaches, the application provider may not have sufficient data, such as market segmentation data and user device data, to determine the technical specifications of the content that should be delivered, who the transmit the content to, and the technical means for delivering the content. Because of the proliferation of internet-connectivity with a multitude of user devices and users often having more than one electronic, internet-compatible device, it can be extremely difficult for a content provider to determine targeted content and messaging for individual users and their respective devices.

BRIEF DESCRIPTION OF THE DRAWINGS

Various embodiments in accordance with the present disclosure will be described with reference to the drawings, in which.

DETAILED DESCRIPTION

Figure 1:
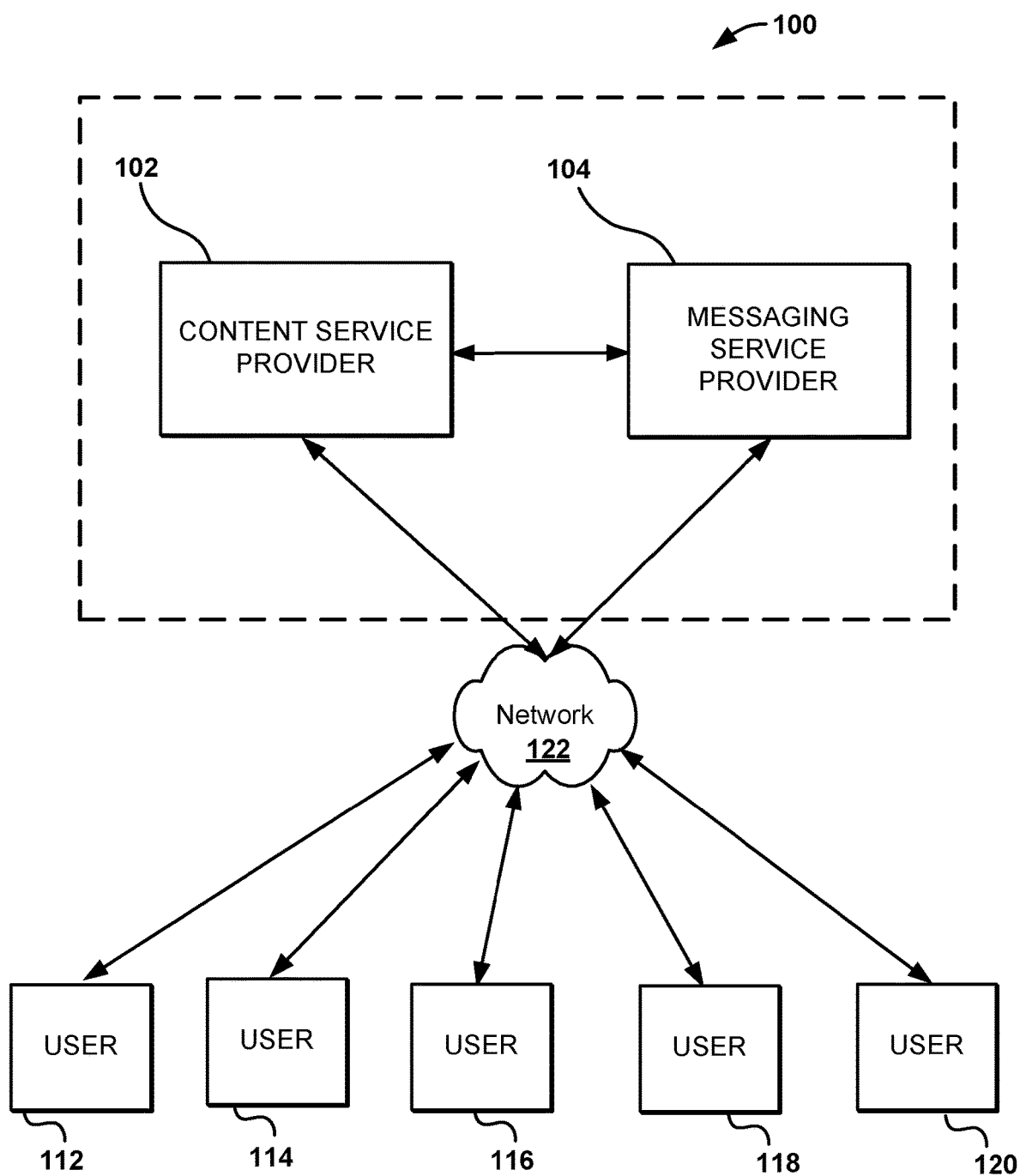
FIG. 1 illustrates an example high-level system for a content filter and message delivery platform in accordance with one embodiment.

Systems and methods in accordance with various embodiments of the present disclosure may overcome one or more of the aforementioned and other deficiencies experienced in conventional approaches to transmit messaging content to end users. Embodiments of the present disclosure allow for content providers to provide custom delivery of messaging content to endpoints (e.g., end users) with enhanced analytical, segmentation, user, and targeting data of a dynamic content filter and messaging delivery platform. Furthermore, according to various embodiments, content provider may be enabled to apply real-time, on-the-fly changes to the endpoints before the messages are delivered.

Content providers may provide content and messaging to its users using a campaign, which can designate content to be provided in the messaging, a delivery schedule for the messaging, and delivery endpoints (e.g., end users and/or their specific devices). Campaigns may be a strategic program for communicating content that is relevant to an end user. Strategic programs for campaigns may include a series of activities used in communicating, promoting, exposing, marketing, or testing a new product and/or service, and may also establish and maintain long term relationships between content providers and their end users. Various strategic programs may involve changing content provided to end users, selecting targeted groups of end users, and/or changing how the content is provided to the end users. Providing relevant content that is compatible with the end users' devices and their preferences is both beneficial to the content provider and the end users. As users increasingly request and receive content, conduct transactions, and communicate over the Internet, content provider providing relevant content to users can encounter many technical obstacles. For example, when a content provider interacts with users solely electronically, then technical requirements of users' devices, operating systems, and communications networks must be met in order for the content to be successfully delivered. Modifying electronic content is also challenging because there are a plurality of digital formats to provide content in. Each type of content can be provided in different electronic formats, for example text content may be provided as a PDF or Microsoft Word document (e.g., *.pdf, *.doc, *.txt, etc.), audio content may be provided as a an MP3 or WAV file (e.g., *.mp3, *.wav, *.wma, etc.), and video content may be provided as an MP4 or AVI file (e.g., *.mp4, *.avi, *.wmv, *.mov, etc.). Furthermore, many different encryption or compressing techniques may be implemented to securely transmit these electronic files. As such, determining messaging content for delivery to electronic devices, delivering the messaging content, and identifying the endpoints (e.g., each endpoint corresponding to an application on a respective electronic device associated with a user) have technical challenges that are addressed by embodiments of the present disclosure.

FIG. 1 illustrates a high-level overview of a system 100 according to various embodiments of the present disclosure. The system 100 may include a messaging service provider 104 and a content service provider 102. The content service provider 102 may be a retailer or other entity that provides services and/or products directly to users. The messaging service provider 104 may provide messaging content delivery for the content service provider 102 to the computing devices of users 112, 114, 116, 118, and 120 via the network 112. The messaging service provider 104 may develop content messaging, delivery scheduling, and endpoint identification (e.g., determining which applications on computing devices of users 112, 114, 116, 118, and/or 120 to transmit messages to) for the content service provider 102. In some embodiments, the content service provider 102 may develop its own content messaging to be delivered by the messaging service provider 104 to the computing devices of users 112, 114, 116, 118, and 120, via the network 112. In other embodiments, the messaging service provider 104 may provide messaging content, hosting, and/or analytics services as a filter and messaging delivery platform to the content service provider 102. In other embodiments, the content service provider 102 and the messaging service provider 104 may be operated by the same entity. The content service provider 102 and/or the messaging service provider 104 may be operatively coupled to the computing devices of various users 112, 114, 116, 118, and 120 via a network 122, such as the Internet, an intranet, a local area network, a cellular network, or another appropriate wired and/or wireless network.

With existing techniques, content service providers may encounter issues with communicating with users in a manner that can establish and maintain user engagement. For example, certain scheduling and segmentation may not be easily implementable by the content service providers themselves, especially across a large number of users and over long period of time to analyze long term user engagement. Additionally, content service providers, with existing technology, may be unable to support dynamic content in messaging to their users. Communication strategies for campaigns may involve real-time modifications of messaging content, and may come from back-end systems of the content service providers. Not only may the messaging content itself be constantly changing, but the endpoints (e.g., specific applications running on computing devices of users) to transmit messages to may also be constantly updated with the dynamic communication strategy program.

As such, embodiments provide content service providers with the ability to communicate with their end users via a filter and message delivery platform to execute their communication strategies. The platform may enable a content service provider to select a specific endpoint (e.g., a particular application on a computing device corresponding to an end user) where the messaging service provider may generate the messaging content for the specific endpoints, and allow the content services providers to add more information to the messaging content on the fly right before the message is actually delivered by the messaging service provider to the application endpoint. In some embodiments, the delivery of the messaging content may be performed by the content service provider after the messaging service provider has generated the initial messaging content or messaging strategy.

According to an embodiment, the messaging service provider may introduce communications strategy as a computer program that contains a hook field to create and update particular communications or messaging strategies. The communications strategy may be implemented using various object oriented programming languages. The communication strategy may designate various settings, such as the type of message being sent out, the destinations of the message (e.g., endpoints), the content of the message, the transmission method of the message, the scheduling of the message, and/or various combinations of the settings previously listed, but not limited to those listed. A communication strategy may include a variety of application settings, which are defined by values contained in specific data fields. For example, the hook field may contain an object (e.g., hook) with various fields, such that a messaging service provider can call the hook to invoke a function identified in one of the fields of the hook. The hook function named in one of the fields of the hook may determine content in the message to be delivered, allows the content service provider to add metadata to the content, and delivers the message to the recipients, including the metadata. The hook function may be invoked when the hook is called. The hook may include various fields, such as a "Mode" field to identify the operating mode of the hook function and either a "WebURL" field to identify a destination address, or a "FunctionName" field to identify a hook function to invoke. The hook function may be operated in at least two different modes, to be defined or selected by the content service provider: (1) message delivery and/or (2) endpoint filtering. In message delivery, the content service provider may identify a target or goal for a communications strategy for a campaign, including content, which may be delivered to endpoints (e.g., applications on computing devices of end users). However, to be consistent with the target or goal of the communications strategy for the campaign, the content service provider may wish to incorporate market segmentation data to generate a message transmission schedule, which may be provided by the messaging service provider according to various embodiments.

Messaging content to endpoints may include promotions, recommendations, technical error notifications, account notifications, surveys, and/or any other communication between the content service provider and the end user for a specific application on the computing device of the end user. For example, a music service provider may gather data on music that a specific user, and pass the data to a messaging service provider to perform analytics, segmentation, and/or other processes on the data to generate a recommendation for other music that specific user might enjoy through the music application provided by the music service provider. In some embodiments, the messaging service provider may pass the recommendation to the music service provider as the content to be included in a message to the specific user, and the music service provider can modify or add other data to the messaging content to customize it for the specific user.

The endpoint, according to embodiments of the present disclosure, may refer to a specific application on a computing device of the end user, and may include a specific address to a particular device, an email address, or a token associated with the specific application, depending on the type of message transmission to the endpoint. As such, a computing device for an end user may be associated with several endpoints depending on the number of applications installed on the computing device. Users may also be associated with several computing devices. For example, if the end user indicates preferences of notifications or messages from an application of a content service provider to be only over email, then the endpoint for that particular application may include basic user account information (e.g., name) and an email address. In another example, the end user may be operating an application on a mobile device and wish to receive messaging through push notifications. As such, the endpoint for that particular application would include user account information, as well as a token for that specific application and for that specific user. The endpoint may also include other metadata associated with the end user, in which in some embodiments, a portion or all of the metadata associated with the end user may be provided or added by the content service provider. In some embodiments, the messaging service provider may provide, or enable the content service provider to create, templates for the messaging content, such that aspects of the template may be easily filled in or added with metadata from the content service provider for customization. For example, in the music service provider example, the recommendation message generated from the messaging service provider may be supplemented with data from the music service provider, such as a hyperlink for an album cover of the recommended artist, images, a video, and/or an audio sample.

According to embodiments of the present disclosure, when the mode field of the hook is set to "DELIVERY," then the content service provider handles the transmission of the messaging content by initiating the communications strategy, which prompts the messaging service provider to invoke a hook function such that the content service provider can dispatch messaging content to the endpoints. In another embodiment, the messaging service provider may handle the transmission of the messaging content and in that case, the mode field of the communications strategy would not be set to "DELIVERY." In DELIVERY mode, the hook field may invoke the hook function in asynchronous mode such that an export dispatcher of the content service provider will not transmit the messaging content to the messaging service provider.

Figure 2:
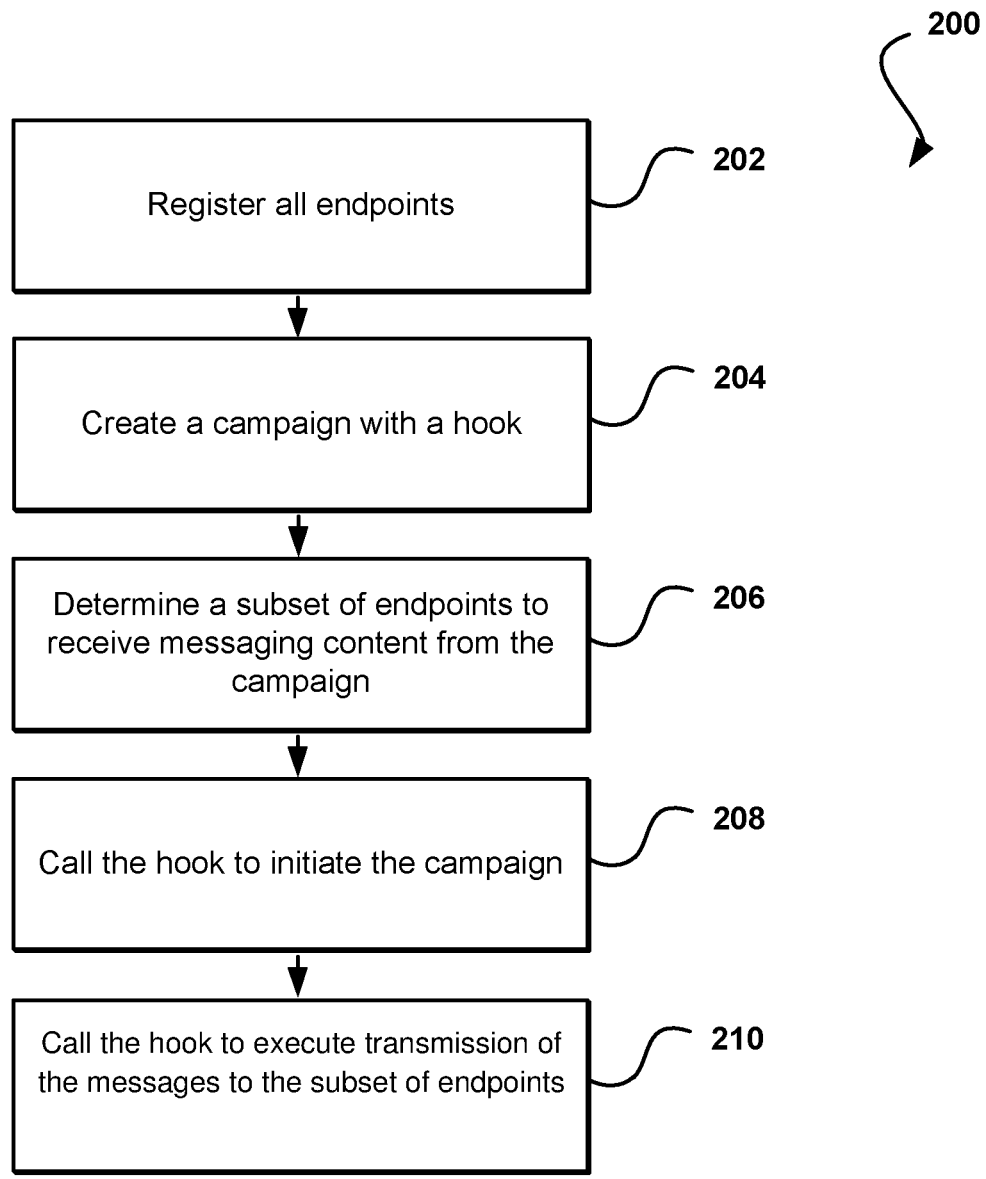
FIG. 2 illustrates an example method for delivering messaging content in accordance with one embodiment.

FIG. 2 illustrates an example method 200 of the transmission of messaging content to endpoints when the hook function operates in DELIVERY mode according to various embodiments of the present disclosure. At 202, a messaging service provider may register all of the endpoints (e.g., corresponding to specific applications on computing devices of end users) for the content service provider. For example, for an application operating on a mobile device, this may involve registering all users of the application (e.g., all users who have downloaded the application to at least one respective mobile device). In another embodiment, the content service provider may determine the endpoints and communicate with the messaging service provider to register all of the endpoints.

At 204, the content service provider may obtain a communications strategy created by a messaging service provider. The communications strategy may include a hook to call a function that executes the delivery of messaging content when the communications strategy is initiated by the content service provider. The communications strategy may be created, obtained, selected, and/or identified by the content service provider and/or the messaging service provider. The communications strategy may be designed for the content service provider based on analytics and segmentation data across a plurality of users and their respective devices. The communications strategy may include the type of messaging content, the messaging content itself, the endpoints to receive the messaging content, and/or a scheduling for the transmission of the messaging content. In another embodiment, the content service provider may create the communications strategy. In other embodiments, the messaging service provider may add or invoke the function in the hook to execute the delivery of the messaging content to the endpoints.

Based on the communications strategy, at 206 the messaging service provider may determine a subset of endpoints to receive the messaging content. Each endpoint is associated with an application on a computing device of an end user. Thus, each computing device of an end user may be associated with multiple endpoints because it may have multiple applications installed on the computing device. For example, the communications strategy for a particular application may be directed to a specific demographic of users, such as users aged 30-39. The messaging service provider may then determine, from the full registry of users for that particular application from step 202, the users of that application that are aged 30-39 to align with the communications strategy created at 204 for that particular application. To illustrate, a content service provider may provide a cooking application. The communications strategy created at 204 may be targeted towards providing recommendations for brunch, and as such, at step 206, the endpoints determined to receive messaging content related to brunch may be users of the cooking application that have been identified to have previously gone to eat brunch, cooked brunch, or have indicated an interest or preference for brunch.

At 208, the content service provider may initiate the communication strategy for the campaign. To initiate the communications strategy, at step 210, the messaging service provider may then call the hook such that the content service provider invokes the hook function at the hook field to execute delivery of the messaging content. When the hook is called by the messaging service provider, the hook function (e.g., function identified in the field of the hook object) is invoked such that the content service provider can execute transmission of the messaging content to the subset of endpoints. The transmission of the messaging content may be performed according to a schedule determined by the communications strategy for the campaign. In the cooking application example for the brunch campaign, the recommendations messaging content may be scheduled to be delivered on Saturday and Sunday mornings at 11 am, when brunch is more common. The messaging content may also be modified to a type of messaging content that is compatible with preferences of the recipient subset of endpoints and/or compatible with technical specifications or parameters of their respective computing devices. For example, if the user of a particular application prefers push notifications or text messages, then the messaging content may be modified to be delivered as a push notification or a text message. In another example, if the user for a specific application is using a computing device that is only enabled for Wi-Fi, then the messaging content type may be transmitted as electronic email for the user using the application. The messaging content type may also include various encryption and/or compression techniques, digital formats, and/or layouts that are suitable for the computing device running the application, for example a display of the messaging content on a mobile phone may be different from a display of the messaging content on a tablet.

The hook object may also specify either a "WebURL" or a "FunctionName" field. The "WebURL" field may specify a web address, uniform resource locator (URL), or any other network location identifier. When this field is specified for the hook object, then the messaging content is transmitted to the specified URL in response to the request to call the hook object.

Alternatively, the hook object of the communications strategy may specify a "FunctionName" field that includes a function to request a payload, which identifies a particular hook function to invoke. When the hook is called, and the function name is specified in this field, then a request payload is transmitted to invoke the particular function. The payload indicates the function names to invoke or any other suitable identifier, resource name, command, or pointer for the function to be invoked. In some embodiments, the hook function may add or incorporate attributes to the endpoints, apply filters to determine applicable recipient endpoints for the messaging content, generate a messaging schedule based on historical information associated with the endpoints, etc. The hook function may then return the subset of applicable recipient endpoints such that either the content service provider or the messaging service provider may transmit the messaging content according to the schedule and to the applicable recipient endpoints. In the case of the delivery mode, the messaging service provider may call the hook, and the function may be invoked by the content service provider to actually execute the transmission of the messaging content to the applicable recipient endpoints.

When the hook function is invoked, a payload may be requested to provide additional data to the hook function. An example of a request payload structure is illustrated below:

```
{
  "MessageConfiguration":              { }
    "CampaignId":       {CampaignId}
    "TreatmentId":      {TreatmentId}
    "ActivityId":       {ActivityId}
    "ScheduledTime":            {ScheduledTime}
    "Endpoints":                {
      {endpointId}:             { }
    }
}
```

As shown above, the request payload structure may include a "MessageConfiguration" parameter to indicate a type of messaging, such as the format. Additional data that may be provided to the hook function may include a map of the endpoints (e.g., "Endpoints"); for example, a list of all of the endpoints or only the applicable recipient endpoints, where each endpoint corresponds to a particular application installed on a respective computing device. An endpoint (e.g., "endpointId") may be any identifier, address, or any other location identifier unique to each application on a computing device. Other data may include a communications strategy identifier (e.g., "CampaignId"), which may identify a previously performed communications or messaging strategy, a predetermined communications strategy, a standard or default communications strategy, or a communications strategy template. The request payload may also include a testing identifier (e.g., "TreatmentId"), which may identify testing methods for transmitting messages, for example, AB testing, where messages may be transmitted to laptops and then the same messages may be transmitted to smart phones to determine the differences. Other data may also include a target identifier (e.g., "ActivityId"), which may identify a goal or target of the communications strategy of the campaign. The request payload may include a schedule for transmitting the messaging content (e.g., "ScheduledTime"), such as an exact time to transmit messages. In some embodiments, the schedule may include a recurring schedule for transmitting messages, a number of messages to be transmitted over a period of time, a frequency of transmitting messages, a minimum number of messages, a maximum number of messages, etc.

According to various embodiments, the call to the hook to invoke the hook function may be retried up to a number of times (e.g., three times), after which may prompt the hook function to fail. For example, the call to the hook may fail to execute if the request to execute the hook function is not authorized. In another example, the hook function may be called, but an error may be returned if the particular function cannot be identified, decoded, or executed.

In another embodiment, another attribute of the communications strategy as defined by the hook object and the specified hook function may include a method of transmitting the messaging content, which may indicate the type of delivery or transmission. The type may be indicated by another field "ChannelType" which may be set to "CUSTOM." For example, the messaging service provider and/or content service provider may have a default transmission mechanism for all communications to end users. However, a content service provider may support multiple custom delivery types for transmission of messages to its end users. For the communications strategic program to support multiple delivery types for transmission of messaging content, the communications strategic program defined by the function may include the channel type field.

Figure 3:
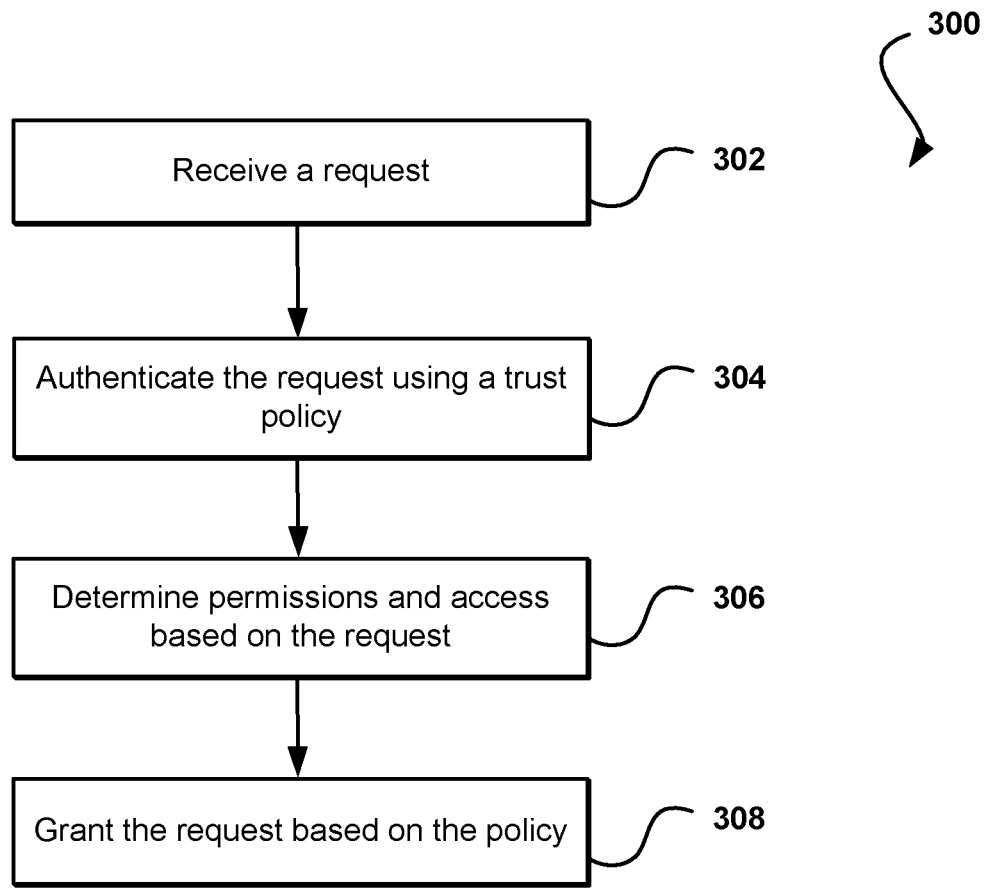
FIG. 3 illustrates an example method for securing messaging content delivery in accordance with one embodiment.

To determine whether the function called is authorized to be executed—thereby initiating the communications strategy and executing or initiating execution of transmittal of messaging content—the messaging service provider may implement various security techniques. FIG. 3 illustrates an example method 300 of authenticating whether the content service provider may invoke the function identified in the hook object that is called. There may be a plurality of content service providers communicatively coupled to the messaging service provider. As such, each content service provider that calls hooks associated with specific hook functions for communications strategies (e.g., execute transmittal of messaging to end users) must be authenticated (e.g., identify that the entity requesting the payload is the content service provider who the entity says it is) and authorized (e.g., the content service provider has permissions and access to execute the particular function. For example, a music service provider should not be authorized to communicate to an end user through the end user's cooking application on the end user's computing device, and vice versa.

At 302, the messaging service provider may receive a request from the content service provider to call a function to be executed, in order to initiate the content service provider's communications strategic program. In some embodiments, the content service provider, in conjunction with the messaging service provider, may specify a trust policy that gives access to function when the communications strategic program was created or generated. The request may include a messaging identifier, which may be a unique identifier that may specify the dispatcher to transmit the messaging content. The request may also include identifiers for the content service provider or requesting entity.

At 304, the messaging service provider authenticates the request using a trust policy to confirm that the content service provider is actually the entity it claims to be. The trust policy may identify what the content service provider would like to do (e.g., the function or action it would like to call), and determine whether the content service provider is authorized to call it. In some embodiments, the trust policy may have been previously provided by the content service provider using SigV4 signing, hash keys, or other digital signing techniques. Determining whether the content service provider is authorized to call a particular function at 306 may include analyzing the trust policy previously stored to identify the permissions and level of access the content service provider has with respect to the particular function. For example, the content service provider may have permissions and access to call the function, but may not have permissions or access to edit or create a new function. In some embodiments, the content service provider may specify a source identifier for resources in the request to limit the level of access to a specific account, application, or event communications strategic program. Subsequently, after the permissions and access to the function have been determined at 306, then the request to call the function may be granted or denied at 308. For example, if the content service provider was authenticated, but not authorized to call the particular function, the request will be denied. The content service provider may be authenticated and the content service provider authorized to call the particular function in order for the request to be granted.

An example of a trust policy structure is illustrated below:

```
{
  "Sid": "MessagingService",
  "Effect": "Allow",
```

-continued

```
    "Principal":   {
        "Service": "pinpoint.us-east-x.aws.com",
    },
    "Action": "lambda:InvokeFunction",
    "Resource": "{hookfunctionname resource}",
    "Condition":        {
        "ArnLike":        {
            "AWS:SourceARN":
            "arn:aws:mobiletargeting:{region}:
{account}:/apps/{application id}/campaigns/{campaign id}"
        }
    }
}
```

As shown above, the trust policy may identify the dispatcher or messaging service (e.g., "Sid"), as well as the permissions (e.g., "Effect": "Allow") to perform a particular action (e.g., "Action": "lambda:InvokeFunction"). In this context, the action is to invoke a particular hook function identified from the hook object. Other parameters in the trust policy structure may include a principal, one or more resources, and other conditions (e.g., associated accounts and campaign/strategy identifiers).

Figure 4:
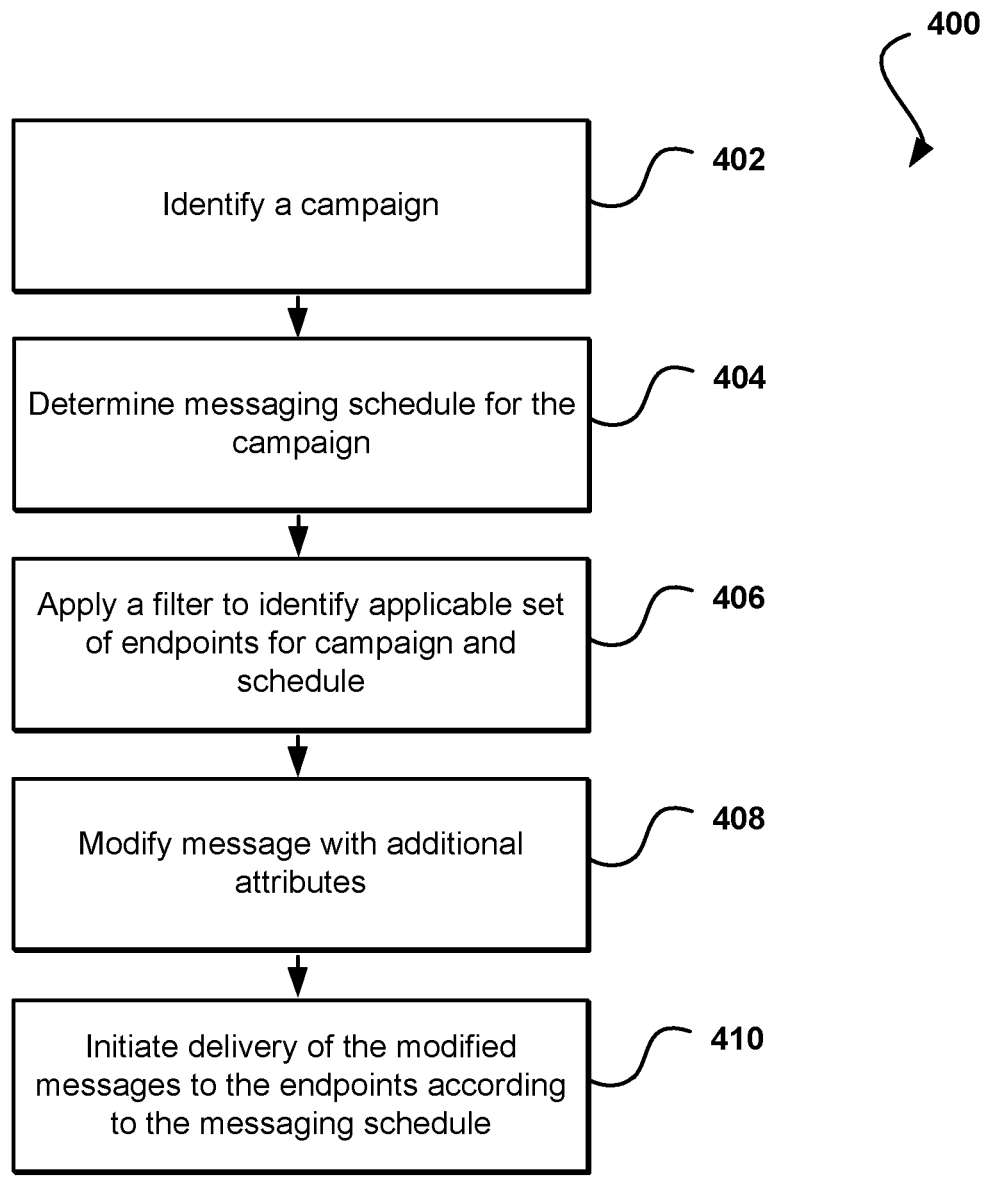
FIG. 4 illustrates an example method for filtering endpoints for messaging content delivery in accordance with one embodiment.

Alternatively, the content service provider may select that the hook function be operating in filter mode, which is when the mode field of the hook object of the communications strategy is set to "FILTER." FIG. 4 illustrates an example method 400 of performing a hook function in filter mode according to various embodiments. At 402, a communications strategy may first be identified by the content service provider. For example, a music service provider may select, obtain, or identify a communications strategy for the music service provider's application to promote a genre of music or artist. The communications strategy may include a wide variety of options for the messaging content, for example animations, links to album covers, music samples, images, etc.

At 404, a content service provider may determine a messaging schedule for the communications strategy. The messaging schedule may be designed to cater and further the goals of the communications strategy of a campaign. For example, in the communications strategy of the campaign to promote a genre of music, the messaging schedule may be transmitting messaging content with music samples of that genre of music to endpoints when they are most likely to be listening to music (e.g., in the morning, on a commute, while exercising, etc.) The messaging schedule may also be dependent on the recipient endpoints (e.g., users of the application identified as early risers to receive morning messages as opposed to messages late at night). In some embodiments, the messaging service provider may determine the messaging schedule based on historical information of the end users.

At 406, the content service provider may apply a filter to identify an applicable set of recipient endpoints for the communications strategy and messaging schedule. The filter may be based on one or more attributes of the endpoints, one or more technical parameters of their respective computing devices, geographic location, time zone, etc. The content service provider may be constantly changing their communications strategy and/or endpoints based on analysis of historical information of their entire registry of endpoints. For example, the communications strategy for the genre of music may be tailored for users of the application within a particular age group, and so the filter may be based on age such that the users of the application to receive the messaging content will be within that age range, and the endpoints will correspond to each user's application on his or her respective computing device. In another example, the communications strategy may be localized for a particular music event in a town, and so the filter may be based on geographic location, such that the endpoints receiving the messaging content will be within a proximity to the music event. In transmitting messages to all registered users of a particular application, the endpoints may be filtered by time zone, such that when users in New York are receiving messaging content about 'wake-up' music at 7 am Eastern Standard Time, the users in San Francisco are not receiving that same messaging content at 4 am Pacific Standard Time, but will receive the 'wake up' music messaging content at 7 am Pacific Standard Time. In some embodiments, the messaging service provider may determine the filter and/or apply the filter for the content service provider.

At 408, the content service provider may modify the messaging content with additional attributes, such as adding metadata associated with the recipient endpoints (e.g., customizing it for individual users with the user's name, such as "Hi Joe"), or other modifications. For example, the content service provider or messaging service provider may determine that email messaging is not as effective as push notifications. As a result, the messaging content may be modified to be a particular type of messaging content that may be preferred. In another example, the content service provider or messaging service provider may notice that short messaging content that only includes a direct hyperlink to additional promotional information may more effective than longer messaging content that includes all the promotional information. Other modifications may include adding images, previews, animations, music samples, video clips, sounds, hyperlinks, etc. The modified message may then be returned to the messaging service provider.

Subsequently at 410, the messaging service provider may initiate transmission of the modified messaging content to the applicable recipient endpoints in accordance with the messaging schedule. In some embodiments, this may involve the content service provider initiating the communications strategy, which in turn causes the messaging service provider to invoke the hook function to execute delivery of the messaging content. As such, the messaging schedule and filter may be part of the hook function of the communications strategy to be executed by the messaging service provider.

Figure 5:
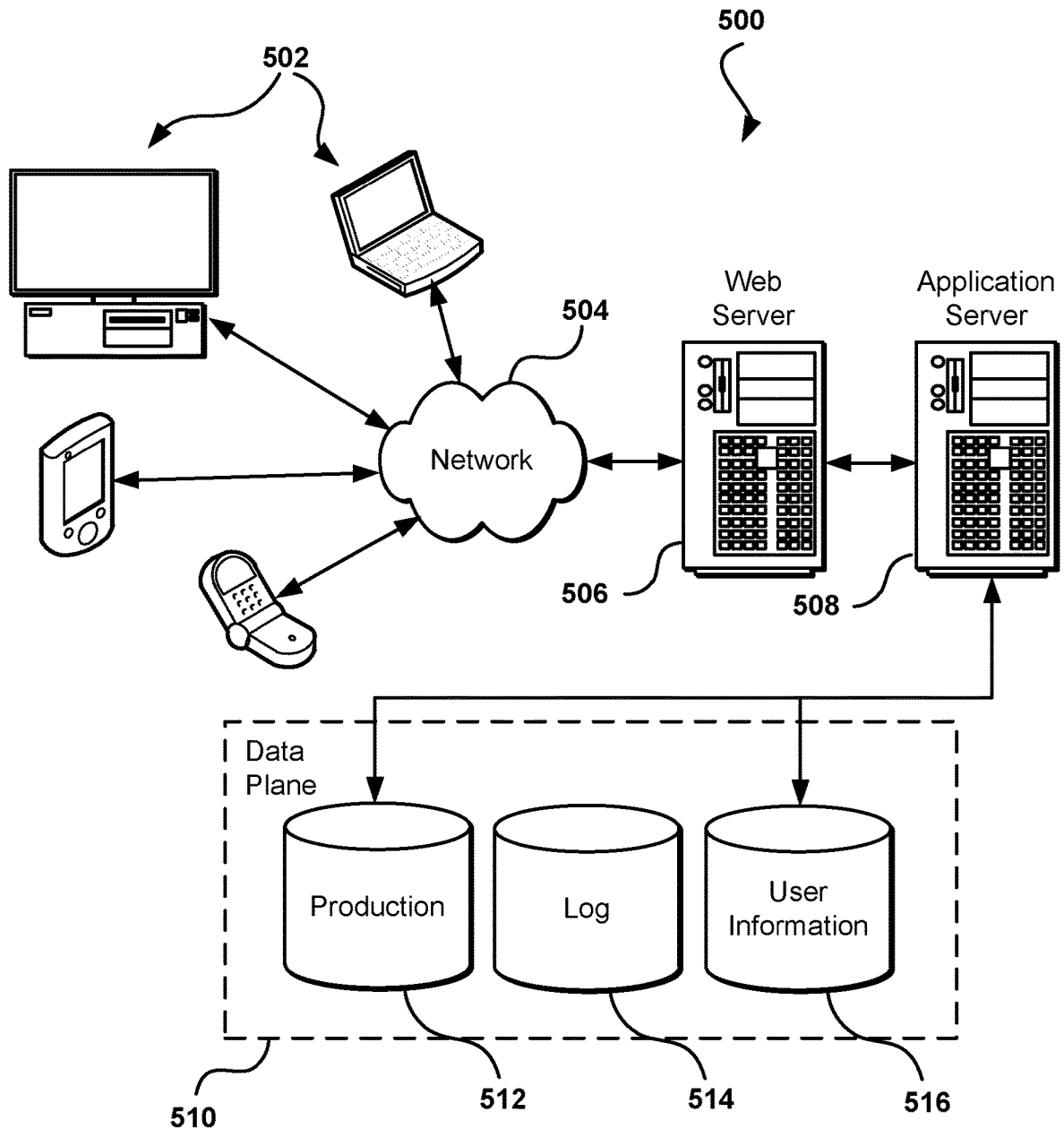
FIG. 5 illustrates an environment in which various embodiments can be implemented.

FIG. 5 illustrates an example of an environment 500 for implementing aspects in accordance with various embodiments. As will be appreciated, although a Web-based environment is used for purposes of explanation, different environments may be used, as appropriate, to implement various embodiments. An electronic client device 502 can include any appropriate device operable to send and receive requests, messages, or information over an appropriate network 504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for Communication communicating via such a network are well known and may be over the network can be enabled by wired or wireless connections, and combinations thereof. In this example, the network includes the Internet, as the environment includes a Web server 506 for receiving requests and serving content in response thereto, although for other networks an alternative device serving a similar purpose could be used as would be apparent to one of ordinary skill in the art.

The illustrative environment includes at least one application server 508 and a plurality of resources, servers, hosts, instances, routers, switches, data stores, and/or other such components defining what will be referred to herein as a data plane 540, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 506, application server 508 and similar components can be considered to be part of the data plane. The handling of all requests and responses, as well as the delivery of content between the client device 502 and the application server 508, can be handled by the Web server. It should be understood that the Web and application servers are not required and are merely example components, as structured code can be executed on any appropriate device or host machine as discussed elsewhere herein.

The data stores of the data plane 540 can include several separate data tables, databases, or other data storage mechanisms and media for storing data relating to a particular aspect. For example, the data plane illustrated includes mechanisms for storing production data 512 and user information 516, which can be used to serve content for the production side. The data plane also is shown to include a mechanism for storing log data 514, which can be used for purposes such as reporting and analysis of the user data, including gathering and aggregating the large amounts of data from multiple users on the network. It should be understood that there can be many other aspects that may need to be stored in a data store, such as for page image information and access right information, which can be stored in any of the above listed mechanisms as appropriate or in additional mechanisms in the data plane 540. The data plane 540 is operable, through logic associated therewith, to receive instructions from the application server 508 and obtain, update, or otherwise process data, instructions, or other such information in response thereto. In one example, a user might submit a search request for a certain type of item. In this case, components of the data plane might access the user information to verify the identity of the user, gather user information, and access the catalog detail information to obtain information about items of that type. The information then can be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature, and not limiting to the scope of the disclosure.

An environment such as that illustrated in FIG. 5 can be useful for various content providers or other such entities, wherein multiple hosts and various types of resources might be used to perform tasks such as serving content, authenticating users, gathering user data and information, analyzing and aggregating user data, predicting user behavior, allocating resources, or performing any of a number of other such tasks. Some of these hosts may be configured to offer similar functionality, while other servers might be configured to perform at least some different functions.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for transmitting messaging content, comprising:
   registering, by one or more computing systems, a plurality of endpoints, each endpoint associated with an application on a computing device;
   selecting a delivery mode or a filter mode for a communications strategy to transmit messaging content, the communications strategy including a function defining at least the messaging content and a schedule for transmitting the messaging content, the messaging content generated based at least in part on historical information of at least one of the plurality of endpoints and the associated application on the computing device; and
   when the delivery mode is selected:
   obtaining the communications strategy to establish communication channels with the plurality of endpoints via a network;
   determining, from the communications strategy, a subset of endpoints to receive the messaging content based at least in part on the historical information and according to the schedule;
   initiating the communications strategy to invoke the function; and
   transmitting, in response to the function being invoked, the messaging content via the network to the subset of endpoints according to the schedule for transmitting the messaging content;
   when the filter mode is selected:
   receiving the communications strategy, the communications strategy including a filter to identify applicable recipient endpoints;
   determining, from the communications strategy, the schedule for transmitting the messaging content;
   applying the filter and the schedule to the plurality of endpoints to identify the applicable recipient endpoints from the plurality of endpoints; and returning the applicable recipient endpoints and the messaging content to initiate transmission of the messaging content to the applicable recipient endpoints.

2. The computer-implemented method of claim 1, wherein the communications strategy further comprises a type of messaging content based at least in part on the historical information, the computer-implemented method further comprising:
identifying the type of messaging content from the communications strategy;
modifying the messaging content to be the type of messaging content identified from the communications strategy and based at least in part on the applicable recipient endpoints; and
returning the modified messaging content to initiate transmittal of the messaging content according to the type of messaging content to the applicable recipient endpoints.

3. The computer-implemented method of claim 1, wherein the filter for the applicable recipient endpoints is based at least in part on one or more attributes of the plurality of endpoints, one or more parameters of the associated respective computing devices, or historical information associated with the plurality of endpoints.

4. The computer-implemented method of claim 1, wherein when the filter mode is selected, the computer-implemented method further comprising:
adding metadata to the messaging content based at least in part on the subset of endpoints; and
returning the messaging content including the metadata to initiate transmission of the messaging content and the metadata to the applicable recipient endpoints according to the schedule.

5. The computer-implemented method of claim 1, wherein each associated respective computing device is associated with one or more endpoints corresponding to one or more applications installed on each associated respective computing device.

6. A computer-implemented method for transmitting messaging content, comprising:
registering, by one or more computing systems, a plurality of endpoints, each endpoint associated with an application installed on a respective computing device;
obtaining a communications strategy to establish communication with the plurality of endpoints corresponding to the application via associated respective computing devices over a network, the communications strategy including a function defining at least the messaging content and a schedule for transmitting the messaging content, the messaging content generated based at least in part on historical information of the plurality of endpoints and the associated respective computing devices, the function being associated with a value obtained from the communications strategy that identifies the function from a plurality of functions;
setting a mode of the function to execute transmission of the messaging content;
determining a subset of endpoints to receive the messaging content based at least in part on historical information of at least one of the plurality of endpoints;
filtering the subset of endpoints, based at least in part on the communications strategy and the schedule, to identify applicable recipient endpoints;
initiating the strategic program by transmitting a request to invoke the function;
receiving a response granting the request to invoke the function; and
executing transmission of the messaging content to the applicable recipient endpoints according to the schedule for transmitting the messaging content.

7. The computer-implemented method of claim 6, further comprising:
setting the mode of the function to filter the plurality of endpoints;
identifying the communications strategy, the communications strategy including a filter to identify applicable recipient endpoints;
determining, from the communications strategy, the schedule for transmitting the messaging content to plurality of endpoints corresponding to the application installed on the associated respective computing devices;
applying the filter and the schedule to the plurality of endpoints to identify the applicable recipient endpoints from the plurality of endpoints;
adding metadata to the messaging content based at least in part on the applicable recipient endpoints; and
providing the applicable recipient endpoints and messaging content including the metadata to initiate transmission of the messaging content to the applicable recipient endpoints.

8. The computer-implemented method of claim 7, wherein the filter is based at least in part on one or more attributes of the plurality of endpoints, a time zone, a geographic area, or one or more parameters of the associated respective computing devices.

9. The computer-implemented method of claim 6, wherein the schedule for transmitting the messaging content includes at least one of: a number of messages to transmit over a time period, a frequency of transmission, a time for transmission, a recurring transmission, a start date for transmission, an end date for transmission, a minimum number of messages to transmit, or a maximum number of messages to transmit.

10. The computer-implemented method of claim 6, further comprising:
identifying a type of messaging content based at least in part on the historical information;
modifying the messaging content to be the type of messaging content identified based at least in part on the applicable recipient endpoints; and
transmitting the messaging content according to the type of messaging content to the applicable recipient endpoints.

11. The computer-implemented method of claim 10, wherein the type of messaging content includes a digital format of the messaging content, a digital layout of the messaging content, an encryption of the messaging content, or a compression of the messaging content that is compatible with the associated respective computing devices.

12. The computer-implemented method of claim 6, further comprising:
authenticating the request based at least in part on a trust policy associated with the one or more computing systems;
determining permissions and a level of access based at least in part on the trust policy and the request; and
granting the request based on the permissions, the level of access, and the authentication of the request.

13. A non-transitory computer readable storage medium storing instructions for transmitting messaging content, the instructions when executed by a processor causing the processor to:

receive a plurality of endpoints, each endpoint associated with an application installed on a respective computing device;

create a communications strategy to establish communication channels with the plurality of endpoints via the application on respective computing devices over a network, the communications strategy including a function defining at least the messaging content and a schedule for transmitting the messaging content, the messaging content generated based at least in part on historical information of at least one of the plurality of endpoints, the function being associated with a value obtained from the communications strategy that identifies the function from a plurality of functions;

determine a subset of endpoints to receive the messaging content based at least in part on historical information;

filter the subset of endpoints, based at least in part on the communications strategy and the schedule, to identify applicable recipient endpoints;

receive, from one or more computing systems, a request to invoke the function to initiate the strategic program; and transmit a response to grant the request to invoke the function, thereby initiating the one or more computing systems to execute transmission of the messaging content to the applicable recipient endpoints according to the schedule for transmitting the messaging content.

14. The non-transitory computer readable storage medium of claim 13, wherein the instructions when executed further cause the processor to:

authenticate the request based at least in part on a trust policy associated with the one or more computing systems;

determine permissions and a level of access based at least in part on the trust policy and the request; and grant the request based on the permissions, the level of access, and the authentication of the request.

15. The non-transitory computer readable storage medium of claim 14, wherein the instructions when executed further cause the processor to:

receive a selection of the communications strategy, the communications strategy including a filter to identify applicable recipient endpoints;

determine, from the communications strategy, the schedule for transmitting the messaging content to the plurality of endpoints corresponding to the application via respective computing devices;

receive, from the one or more computing systems, the applicable recipient endpoints from the plurality of endpoints based at least in part on the filter;

receive, from the one or more computing systems, modified messaging content; and execute transmission of the modified messaging content to the applicable recipient endpoints according to the schedule for transmitting the messaging content.

16. The non-transitory computer readable storage medium of claim 15, wherein the filter is based at least in part on one or more attributes of the plurality of endpoints, a time zone, a geographic area, or one or more parameters of the associated respective computing devices.

17. The non-transitory computer readable storage medium of claim 13, wherein the schedule for transmitting the messaging content includes at least one of: a number of messages to transmit over a time period, a frequency of transmission, a time for transmission, a recurring transmission, a start date for transmission, an end date for transmission, a minimum number of messages to transmit, or a maximum number of messages to transmit.

18. The non-transitory computer readable storage medium of claim 13, wherein the instructions when executed further cause the processor to:

identify a type of messaging content based at least in part on historical information;

modify the messaging content to be the type of messaging content identified; and provide, to the one or more computing systems, with the response granting the request to invoke the function, the modified messaging content.

19. The non-transitory computer readable storage medium of claim 18, wherein the type of messaging content includes a digital format of the messaging content, a digital layout of the messaging content, an encryption of the messaging content, or a compression of the messaging content that is compatible with the associated respective computing devices.

20. The non-transitory computer readable storage medium of claim 13, wherein the instructions when executed further cause the processor to:

create a template for the communication strategy based at least in part on historical information of at least one of the plurality of endpoints, the template including the function;

provide the template to the one or more computing systems; and receive one or more selections to modify the template, including a mode of the function or a custom communication channel type.

* * * * *